United States Patent [19]

Noriaki

[11] 4,379,867
[45] Apr. 12, 1983

[54] WRITING MEDIUM FOR BALL POINT WRITING INSTRUMENT

[76] Inventor: Tsunoda Noriaki, No. 38, Shinmachi, Tanogun, Gunma-ken, Japan

[21] Appl. No.: 290,438

[22] Filed: Aug. 6, 1981

[51] Int. Cl.$^3$ .............................................. C08K 5/10
[52] U.S. Cl. .................................... 523/161; 524/286; 524/297; 524/518; 524/553
[58] Field of Search ..................... 260/23.7 M, 31.8 H; 526/281; 523/161; 524/286, 297, 518, 553

[56] References Cited

U.S. PATENT DOCUMENTS

| | | | |
|---|---|---|---|
| 2,721,189 | 10/1955 | Anderson et al. | 260/93.1 |
| 2,985,611 | 5/1961 | Gaylord et al. | 260/30.8 |
| 3,083,190 | 3/1963 | Gaylord | 260/80.5 |
| 3,234,157 | 2/1966 | Schefbauer | 260/23 |
| 3,299,017 | 1/1967 | Zelinski et al. | 260/82.1 |
| 3,320,222 | 5/1967 | Cohen | 260/88.1 |
| 3,330,815 | 7/1967 | McKean et al. | 260/93.1 |
| 3,449,298 | 6/1969 | Matzner | 260/47 |
| 3,557,062 | 1/1971 | Vergne et al. | 260/78.4 |
| 3,645,959 | 2/1972 | Pilato et al. | 260/33.6 DA |
| 3,715,342 | 2/1973 | Colomb, Jr. et al. | 260/80.81 |

Primary Examiner—Joseph L. Schofer
Assistant Examiner—Bernard Lipman
Attorney, Agent, or Firm—Andrus, Sceales, Starke & Sawall

[57] ABSTRACT

A writing medium capable of being erased by merely mechanically rubbing with an ordinary pencil eraser after writing and capable of forming a drawing line possessing high adhering strength onto the surface of paper even immediately after writing on the paper. The writing medium contains a pigment as a colorant, a polynorbornane and/or trans-1,4-polyisoprene, and a mixture solvent solution for dissolving the polynorbornane and the trans-1,4-polyisoprene and containing a low boiling point organic solvent having a boiling point of less than 180° C. and a high vaporization rate and operating as a plasticizer for the polynorbornane and the trans-1,4-polyisoprene and a high boiling point organic solvent having a boiling point of higher than 300° C. and a low vaporization rate. Thus, a drawing line written with the writing medium can be erased merely by rubbing with the eraser within several hours after writing, and is not erased thereafter.

12 Claims, No Drawings

WRITING MEDIUM FOR BALL POINT WRITING INSTRUMENT

BACKGROUND OF THE INVENTION

This invention relates to a writing medium to be filled in a ball point writing instrument and, more particularly, to a writing medium which can be erased by merely mechanically rubbing with an ordinary pencil eraser after writing, which can form a drawing line incorporating high adhering strength onto the surface of paper even immediately after writing on the paper with high solidifying velocity on the surface of paper, and which also incorporates excellent ageing stability.

There were heretofore as a writing medium or ink for a ball point writing instrument or a ball point pen, "liquid lead ink" which contained graphite and carbon black together with oily ingredients, "natural rubber-containing ink" which contained natural rubber ingredient suspended in composition ingredient together with pigments, and "rubber ingredient-containing ink" which contained, as disclosed, for example, in Japanese Patent Laid-open No. 145731/1979, rubber ingredient suspended in composition ingredient together with pigment. Since the former ink impregnates oily ingredient in a drawing line formed on the surface of paper into the interior of the paper together with the fine particles of graphite or carbon black as colorants, it cannot sufficiently perform its original purpose of obtaining erasable drawing line. Though the latter ink can obtain an erasable drawing line to some degree, it is not yet complete and further since it incorporates slow solidifying velocity on the surface of paper, it accommodates low adhering strength onto the surface of paper immediately after writing. It has accordingly such disadvantages and drawbacks that, if another paper is superimposed on the written surface of paper immediately after writing, if writer's hand is contacted with the drawing line immediately after writing or if the surface of paper is rubbed, the colorant forming the drawing line is readily transferred to the other part on the surface of paper thereby contaminating the surface of paper. In addition, inasmuch as the dissolution stability of added rubber ingredient to a solvent is low, the conventional ink has such disadvantage as low ageing stability in itself.

SUMMARY OF THE INVENTION

Accordingly, a primary object of this invention is to provide a writing medium for a ball point writing instrument which can obtain a drawing line capable of being completely erased merely by rubbing with an ordinary pencil eraser after writing.

Another object of this invention is to provide a writing medium for a ball point writing instrument which incorporates high solidifying velocity on the surface of paper.

Yet another object of this invention is to provide a writing medium for a ball point writing instrument which can obtain a drawing line incorporating high adhering strength onto the surface of paper after writing.

Still another object of this invention is to provide a writing medium for a ball point writing instrument which has excellent ageing stability.

Still another object of the invention is to provide a writing medium for a ball point writing instrument which incorporates high erasability, low rubbing contamination degree of drawing line and no contamination of the surface of paper with hands and fingers even after writing.

DESCRIPTION OF THE PREFERRED EMBODIMENTS

According to the present invention, the writing medium contains as indispensable components a pigment as a colorant in the writing medium such as an ink for a ball point writing instrument such as a ball point pen a polynorbornane as a high molecular compound containing more than approx. 2,000,000 of molecular weight represented by the following formula in a repetition unit and an additive in a range of thermoplastics

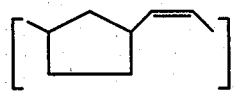

or a mixture high molecular compound of the above polynorbornane and a trans-1,4-polyisoprene as a high molecular compound represented by the following formula in a repetition unit in the same range of thermoplastics as above

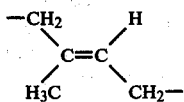

and a mixture solvent solution of a low boiling point organic solvent having a boiling point of less than 180° C. and a high vaporization rate and operating as a plasticizer for the polynorbornane and/or the trans-1,4-polyisoprene in the high molecular compound and a high boiling point organic solvent having a boiling point of higher than 300° C. and a low vaporization rate. The writing medium of this invention is produced by adding the polynorbornane or the mixture of the polynorbornane and the trans-1,4-polyisoprene to the mixture solvent solution. Thus, the writing medium of the invention thus produced possesses properties capable fo completely being erased at a drawing line written merely by rubbing the drawing line with an ordinary pencil eraser after writing the drawing line.

The polynorbornane and the trans-1,4-polyisoprene of the high molecular compound used in the writing medium of this invention belong to the range of thermoplastics exhibiting excellent coherent and adherent properties. These properties of the high molecular compound provide properties of accelerating the solidification rate of the writing medium on the surface to be written and obtaining a drawing line having high adhering strength to the surface of paper to be written after writing the drawing line on the surface of paper for the writing medium for the ball point writing instrument according to the present invention.

More particularly, the polynorbornane and the trans-1,4-polyisoprene of the high molecular compound are compounds which belong to the range of thermoplastics possessing higher crystallinity and glass transition point being higher than the room temperature as well as higher hardness and film forming performance than natural rubber component. Thus, these porperties of the high moleculare compounds act to accelerate the solidification rate of the writing medium on the surface of paper to be written and to form a drawing line having high adhering strength to the surface of paper to be written after writing the drawing line on the surface of paper. The writing medium thus produced according to this invention can perform the action of removing or eliminating the disadvantages and drawbacks such that, if the surface written with the writing medium such as the ink is superimposed on another surface of paper immediately after writing on the surface or if a writer's hand makes contact with the drawing line written immediately after writing and results in rubbing the surface therewith, the colorant of the drawing line is transferred to the other part on the surface of paper thereby contaminating the surface of paper thus written.

Since the polynorbornane and the trans-1,4-polyisoprene of the high molecular compounds which belong to the range of the thermoplastics used in the writing medium of this invention further possess excellent solubility for the organic solvent and preferable dissolution stability, the writing medium itself incorporates excellent ageing stability.

The writing medium for a ball point writing instrument of the present invention advantageously contains indispensably a high molecular compound having the polynorbornane or a mixture high molecular compound having the polynorbornane and the trans-1,4-polyisoprene and a pigment as a colorant in a mixture solvent solution which will be described in greater detail.

That is, the mixture solvent solution in the writing medium for the ball point writing instrument according to this invention contains a low boiling point organic solvent which possesses a boiling point of less than 180° C. and high vaporization rate and which exhibits an action as a plasticizer for the polynorbornane and the trans-1,4-polyisoprene of high molecular compounds contained in the writing medium, such as, for example, xylene, heptane, hexane, etc. and a high boiling point organic solvent which possesses a boiling point of higher than 300° C. and low vaporization rate, such as, for example, naphthene base oil, dioctyl phthalate, dioctyl adipate, etc. as a mixture solution.

The low boiling point organic solvent thus possessing high vaporization rate in the mixture solvent solution serves to dissolve the polynorbornane and the trans-1,4-polyisoprene as the high molecular compounds and to thereby prevent the pigment as a colorant contained in the drawing line written on the surface of paper via a ball point writing instrument as well as the polynorbornane and the trans-1,4-polyisoprene as the high molecular compounds from rapidly impregnating into the gaps in the construction of the paper. As a result, the writing medium thus produced according to this invention can possess the specific properties capable of being erased merely by rubbing the drawing line written on the surface of paper with an ordinary pencil eraser.

On the other hand, the high boiling point organic solvent serves to stably suspend the pigment component as a colorant in the writing medium and possesses a lubricating action for the writing medium itself.

It should be noted that although the foregoing description is directed to the writing medium for the ball point writing instrument which contains at least a pigment as a colorant, and a high molecular compound having a polynorbornane or a mixture compound of the polynorbornane and a trans-1,4-polyisoprene in a mixture solvent solution having a low boiling point organic solvent and a high boiling point organic solvent, the writing medium of the invention may also contain in addition to the above components a lubricant such as, for example, oleic acid, lauric acid, stearic acid, etc., an antiseptic agent and so forth in an adequate amount in a mixture within the scope of the present invention.

The ratio of the indispensable components in the writing medium for the ball point writing instrument of the present invention depends upon the ratio among the respective components and is generally used in the rates as described below.
high molecular compound: 15–45 wt parts
low boiling point organic solvent: 10–50 wt parts
high boiling point organic solvent: 15–35 wt parts
pigment: 12–30 wt parts It should be understood from the foregoing description that since the writing medium for the ball point writing instrument thus contains a pigment as a colorant and a high molecular compound of the polynorbornane or a mixture compound of the polynorbornane and the trans-1,4-polyisoprene as indispensable components in the mixture solvent solution of the low boiling point organic solvent and the high boiling point organic solvent, the drawing line thus written with the writing medium of the invention on the surface of paper can be erased merely by rubbing it with an ordinary pencil eraser within several hours after writing the drawing line on the surface of paper, and is not erased similarly to the writing mark written by the conventional ball point pen thereafter, the drawing line thus written on the surface of the paper still possesses high adhering strength to the surface of the paper even immediately after writing the drawing line on the surface, together with excellent ageing stability.

The writing medium for the ball point writing instrument according to the present invention will be hereinafter described further by way of typical exemplary process for producing the writing medium of the invention with respect the concrete composition.

EXAMPLE 1

45 g of xylene and 5 g of polynorbornane (trade name, NORSOLEX manufactured by Nippon Geon Co., Ltd.) were filled in a beaker having 200 ml in volume. The beaker was stirred for approx. 2 hours at a room temperature, and the mixture in the beaker was dissolved.

On the other hand, 12.5 g of carbon black pigment (trade name, Mitsubishi Carbon Black MA-100 manufactured by Mitsubishi Chemical Industries, Ltd.) and 39 g of naphthene base process oil (trade name, SANSEN 255ZJ manufactured by Nippon San Sekiyu Co., Ltd.) were filled in another beaker having 200 ml in volume. The beaker was agitated at a room temperature. After the components in the mixture in the beaker were thus dispersed, the beaker was installed in a three-roll mill, and the mixture in the beaker was sufficiently kneaded and dispersed.

The polynorbornane solution obtained as above was added to the kneaded mixture thus obtained, and the mixture was mixed. The final mixture was kneaded and dispersed further in the three-roll mill, and the writing medium (A) for the ball point writing instrument according to the present invention was thus obtained.

EXAMPLE 2

40 g of toluene, 3 g of polynorbornane (trade name, NORSOLEX) and 7.5 g of trans-1,4-polyisoprene (trade name, Kuraray Transpolyisoprene TP-301 manufactured by Kuraray Isoprene Chemical Co., Ltd.) were filled in a beaker haing 200 ml in volume. The beaker thus filled was stirred at a room temperature for approx. 2 hours, and the components in the mixture in the beaker were dissolved.

The physical properties of the trans-1,4-polyisoprene (trade name, Kuraray Transpolyisoprene TP-301) are as below.

melting point: 68° C.
Crystallinity (at 25° C.): 35%
Hardness (Shore C): 78
Recovery Elongation: less than 1%
Young's modulus (longitudinal elastic modulus): $2.63 \times 10^9$ dyne/cm$^2$.

On the other hand, 13 g of carbon black pigment (trade name, Mitsubishi Carbon Black MA-100), 27 g of amaro base process oil (trade name, DIANA process oil AC-12 manufactured by Idemitsu Kosan Co., Ltd.) and 20 g of naphthene base process oil (trade name, SANSEN 255ZJ) were filled in another beaker having 200 ml in volume. The beaker was agitated at a room temperature. After the components in the mixture in the beaker were thus dispersed, the beaker was installed in a three-roll mill, and the mixture in the beaker was sufficiently kneaded and dispersed.

The mixture solution of the polynorbornane and the trans-1,4-polyisoprene obtained as above was added to the kneaded mixture thus obtained, and the mixture was mixed. The final mixture was kneaded and dispersed further in the three-roll mill, and the writing medium (B) for the ball point writing instrument according to the present invention was thus obtained.

Comparison Example 1

40 g of fatty petroliem series solvent (trade name, Esso Rubber Solvent manufactured by Esso Chemical Co., Ltd.) and 9 g of cis-1,4-polyisoprene (trade name, Kuraray Cis Polyisoprene IR-10 manufactured by Kuraray Isoprene Chemical Co., Ltd.) were filled in a beaker having 200 ml in volume. The beaker was stirred at a room temperature for approx. 2 hours, and the components in the mixture in the beaker were dissolved.

On the other hand, 10 g of carbon black pigment (trade name, Mitsubishi Carbon Black MA-100), 36 g of dioctyl phthalate and 6 g of stearic acid were filled in another beaker having 200 ml in volume. The beaker was agitated at a room temperature. After the components in the mixture in the beaker were thus dispersed, the beaker was installed in a three-roll mill, and the mixture in the beaker was sufficiently kneaded and dispersed.

The cis-1,4-polyisoprene solution obtained as above was added to the kneaded mixture thus obtained, and the mixture was mixed. The final mixture was kneaded and dispersed further in the three-roll mill, and the writing medium (C) for the ball point writing instrument for comparison was thus obtained.

The writing media (A), (B) and (C) thus obtained in the above Examples 1, 2 and the Comparison Example 1 were then filled respectively in ball point pens AP-106 (manufactured by Mitsubishi Pencil Co., Ltd.), and were tested for the writing property when writing therewith, the erasability of the drawing lines written on the surface of paper, and the rubbing contamination degree of the drawing line. The test results of these writing media (A), (B) and (C) were as shown in Table 1.

TABLE 1

| Types of media | Testing items | | |
|---|---|---|---|
| | Erasability (After 10 min. after writing) | Rubbing contamination degree | Writing Properties |
| Medium (A) | 92% | Extremely low | Preferable |
| Medium (B) | 93% | Extremely low | Preferable |
| Medium (C) | 79% | Large | Preferable |

The erasability was tested according to the testing procedure stipulated in JIS-S-6050 (1975) "Erasability with plastic eraser), and was obtained from the value of the drawing line written on the surface of paper and erased after ten minutes after writing the drawing line on the surface. The rubbing contamination degree was tested according to the testing procedure stipulated in JIS-S-6039 (1980) "refill for ball point pen" in the paragraph 7.9 Drying test, and was obtained from the result visually determined as to the degree of the contamination due to the writing medium or ink adhered onto the surface of paper superimposed on the surface of paper written with the drawing line by pulling laterally the paper and then sliding it thereon.

As apparent from the results listed in the Table 1, the drawing line written with the writing medium produced according to the present invention on the surface of paper for a ball point writing instrument possesses not only preferable erasability but low degree of rubbing contamination of the drawing line as compared with the conventional writing medium or ink which uses cis-1,4-polyisoprene as the similar compound to the high molecular compound used in the writing medium of the present invention. Thus, even if the writing medium of the present invention is written on the surface of paper, the surface of paper is not contaminated due to the rubbing by writer's hand at the writing time as the advantages of the present invention.

What is claimed is:
1. A writing medium for a ball point writing instrument comprising:
a pigment at least as a colorant,
a polynorbornane represented by the following formula in a repetition unit, and

a solvent solution for dissolving said polynorbornane and containing a low boiling point organic solvent having a boiling point of less than 180° C. and a high boiling point organic solvent having a boiling point of higher than 300° C.

2. The writing medium according to claim 1 wherein the amount of said polynorbornane ranges from 15 wt part to 45 wt part, the amount of said pigment ranges from 12 wt parts to 30 wt parts, the amount of said low boiling point organic solvent ranges from 10 wt parts to 50 wt parts, and the amount of said high boiling point organic solvent ranges from 15 wt parts to 35 wt parts.

3. The writing medium according to claim 1 wherein said low boiling point organic solvent is selected from the group consisting of xylene, heptane and hexane.

4. The writing medium according to claim 1 wherein said high boiling point organic solvent is selected from the group consisting of naphthene base oil, dioctyl phthalate and dioctyl adipate.

5. The writing medium according to claim 1 further comprising a lubricant.

6. The writing medium according to claim 5 wherein said lubricant is selected from the group consisting of oleic acid, lauric acid, and stearic acid.

7. A writing medium for a ball point writing instrument comprising:

a pigment at least as a colorant, a mixture containing a polynorbornane represented by the following formula in a repetition unit and

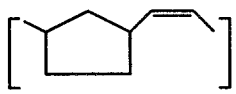

a trans-1,4-polyisoprene represented by the following formula in a repetition unit, and

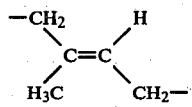

a solvent solution for dissolving said polynorborane and said trans-1,4-polyisoprene and containing a low boiling point organic solvent having a boiling point of less than 180° C. and a high boiling point organic solvent having a boiling point of higher than 300° C.

8. The writing medium according to claim 7 wherein the amount of said mixture ranges from 15 wt parts to 45 wt parts, the amount of said pigment ranges from 12 wt parts to 30 wt parts, the amount of said low boiling point organic solvent ranges from 10 wt parts to 50 wt parts and the amount of said high boil point organic solvent ranges from 15 wt parts to 35 wt parts.

9. The writing medium according to claim 7 wherein said low boiling point organic solvent is selected from the group consisting of xylene, heptane and hexane.

10. The writing medium according to claim 7 wherein said high boiling point organic solvent is selected from the group consisting of naphthene base oil, dioctyl phthalate and dioctyl adipate.

11. The writing medium according to claim 7 further comprising a lubricant.

12. The writing medium according to claim 11 wherein said lubricant is selected from the group consisting of oleic acid, lauric acid, and stearic acid.

* * * * *